(12) United States Patent
Bayer

(10) Patent No.: US 6,917,854 B2
(45) Date of Patent: Jul. 12, 2005

(54) METHOD FOR RECOGNITION DETERMINATION AND LOCALIZATION OF AT LEAST ONE ARBITRARY OBJECT OR SPACE

(75) Inventor: Thomas Bayer, Igersheim (DE)

(73) Assignee: Wittenstein GmbH & Co. KG, Igersheim (DE)

( * ) Notice: Subject to any disclaimer, the term of this patent is extended or adjusted under 35 U.S.C. 154(b) by 217 days.

(21) Appl. No.: 10/204,507

(22) PCT Filed: Dec. 9, 2000

(86) PCT No.: PCT/EP00/12458

§ 371 (c)(1),
(2), (4) Date: Dec. 9, 2002

(87) PCT Pub. No.: WO01/63372

PCT Pub. Date: Aug. 30, 2001

(65) Prior Publication Data

US 2003/0156493 A1 Aug. 21, 2003

(30) Foreign Application Priority Data

Feb. 21, 2000 (DE) .......................................... 100 07 864

(51) Int. Cl.[7] .............................................. G06F 19/00
(52) U.S. Cl. ....................... 700/245; 700/253; 700/255; 700/258; 700/262; 318/568.12; 318/580; 318/581; 180/167; 180/168; 180/169; 219/124.34; 401/23; 901/1; 29/711
(58) Field of Search ................................ 700/245, 253, 700/255, 258, 262; 318/568.12, 580, 581; 180/167–169; 219/124.34; 701/23; 901/1; 29/711; 297/325

(56) References Cited

U.S. PATENT DOCUMENTS 5,701,965 A * 12/1997 Kamen et al. ............... 180/7.1
6,217,114 B1 * 4/2001 Degonda ..................... 297/325
6,592,315 B2 * 7/2003 Osborne, Jr. ................. 414/9
2001/0056313 A1 * 12/2001 Osborne, Jr. ............... 700/245
2002/0064438 A1 * 5/2002 Osborne, Jr. ................. 414/9

FOREIGN PATENT DOCUMENTS

WO     WO 9417964    * 8/1994

OTHER PUBLICATIONS

Graser et al., Technological Solutions to Autonomous Robot Control, 1998, Internet, pp. 1–8.*

Dallaway et al, The user interface for interactive robotic workstations, 1994, Internet, pp. 1–8.*

Martens et al., A friend for assisting handicapped people, 2001, Internet, pp. 1–9.*

Song et al., KARES: Intelligen rehabilitation robotic system for the disabled and the elderly, 1996, Internet/IEEE, pp. 1–5.*

Veryha et al., Method and system for robot end effector path correction using 3–D ultrasound sensors, 2000, IEEE, pp. 1240–1243.*

(Continued)

Primary Examiner—Richard M. Camby
Assistant Examiner—McDieunel Marc
(74) Attorney, Agent, or Firm—Bachman & LaPointe, P.C.

(57) ABSTRACT

A method for recognition, determination and localization of at least one arbitrary object or space and the picking up of said object, by at least on robot, in particular, a service robot, which operates independently on the base surface. The method is achieved, whereby the robot is oriented within at least one room by room co-ordinates and/or co-ordinates of arbitrary objects in the room, transmitted to the robot by at least one sensor element, in particular, a transponder or transmitter.

14 Claims, 4 Drawing Sheets

OTHER PUBLICATIONS

Terada et al., Towards cognitive agents: Embodiment based object recognition for vision–based mobile agents, 2000, IEEE, pp. 2067–2072.*

Loos et al., ProVAR assistive robot system architecture, 1999, IEEE, pp. 741–746.*

Rodney, An autonomous wheelchair at an art gallery, 1997, Internet, pp. 1–3.*

Chen et al., Performance statistics of a head–operated force–reflecting rehabilitation robot system, 1997, Internet, pp. 0–21.*

Prassler et al., A robotic wheelchair for crowded public environments, 2001, Internet, pp. 1–8.*

* cited by examiner

METHOD FOR RECOGNITION DETERMINATION AND LOCALIZATION OF AT LEAST ONE ARBITRARY OBJECT OR SPACE

BACKGROUND OF THE INVENTION

The invention relates to a method for identifying, determining, localizing at least one arbitrary object and/or room and for picking up the at least one object using a robot, particularly a service robot, which is conveyed independently on a foundation, and to a system for carrying out the method.

Such methods and systems are known on the market and are in common use in a wide variety of forms and versions.

In particular, mobile platforms, robots, service robots or the like are known which are equipped with extremely complex environment detection systems, such as ultrasound scanners, laser scanners or the like.

In addition, such mobile platforms contain image processing systems, for example for identifying, scanning in or capturing data for objects in rooms. Corresponding mobile platforms are also known which have environment identification devices for identifying particular objects or the like.

So that such mobile platforms and robots can be conveyed independently in different rooms, they frequently have associated position-finding systems. These are inaccurate and need to be realigned often.

In addition, particularly such position-finding systems require exact control and, in particular, programming in order to move these mobile platforms, particularly robots, to the desired location. Such robots are frequently provided with appropriate motion sensors for identifying an obstacle, for example.

A drawback of the conventional mobile platforms, particularly robots, is that although such environment detection systems, image processing systems and position-finding and motion systems are known on the market in a variety of forms and versions, the complexity of the technology and the extremely high manufacturing costs mean that they are not marketable. Particularly for the consumer, for example as a household or office aid, such mobile platforms are not at all suitable, since they are too expensive to buy and are too complex to use.

U.S. Pat. No. 5,202,832 describes a system for transporting goods using a movable module which can be conveyed in relation to a second vehicle for the purpose of transferring goods. So that the vehicles can be moved exactly in relation to one another, a plurality of different systems using transmitters and receivers and using lasers and bar codes are required.

DE 299 12 726 and U.S. Pat. No. 5,172,121 describe driverless vehicles which can be conveyed on rails and are provided with a transponder element for determining their position at quite particular positions.

The present invention is based on the object of providing a method and a system for identifying, determining, localizing at least one arbitrary object and/or room which eliminate the aforementioned drawbacks and which provide a system, particularly a method, for picking up arbitrary objects in an arbitrary room and dropping them off or providing them at desired locations in a simple, exact and inexpensive manner.

SUMMARY OF THE INVENTION

The foregoing object is achieved by virtue of the present invention involves every room being allocated at least one sensor element, particularly a transponder, which contains a quite specific piece of information, if appropriate in encrypted form. This key or code can be used to program an associated room into a robot, particularly a service robot, said programming relating, in particular, to the room's coordinates or to coordinates of fixed devices, shelves, beds or the like. In this way, the sensor element sends these coordinates, if appropriate using the code, as information to the robot, which can then take the room coordinates as a basis for orienting itself and moving in this room on the basis of the signal from the sensor element or transponder. On the basis of its bearing with respect to the transponder, the robot identifies how it can move in the room. The room coordinates can be stored in the robot and can be activated only by the sensor element.

Another advantage of the present invention is that each arbitrary object situated in the household or office, for example, is allocated a transponder which likewise contains a particular key.

The transponder sends this key to the robot. The robot stores the data for the individual objects, said stored data relating, in particular, to the name of the object, its size, its weight, and possibly its transport bearing. This allows the robot to identify accurately which object can be found where and at what location in a room.

If one or other object needs to be picked up, the robot can be conveyed independently as appropriate, with other objects which may be in the way being moved out of the way by the robot as appropriate, or the fixed objects, such as tables, being bypassed as a result of the spatial size coordinates identified by the robot.

This provides a simple and very inexpensive way for any arbitrary object to be identified, localized and associated and to be picked up by the robot, particularly by its gripping device.

It is also possible to use the robot to find a particular object which is missing by virtue of the object sending an appropriate signal to the robot, and the room in which the object is situated being able to be localized in this way.

Such a robot can also be used to perform particular actions and work steps, such as tidying up the household or office and laying the table; furthermore, this can be done in selectable and programmable steps.

By way of example, it can remove single plates from a shelf or from a cupboard, put them on a table, add corresponding cups or the like, etc. Following a meal, for example, the robot can, upon an appropriate signal, clear the table, if appropriate fill the dishwasher and empty it again when it has finished its wash cycle, or the like. In this context, the invention has no set limits.

It has also been found to be particularly advantageous to allocate every object at least two sensor elements, particularly transponders.

This allows an arbitrary object, particularly a transport bearing for the object, to be accurately defined and determined, since two different vectors transmit the signals to the robot, particularly a service robot.

On the basis of these two vectors, the object, particularly the bearing, and also a transport bearing for any arbitrary object, can be determined exactly and accurately.

In this regard, by way of example, the robot can pick up a book from a table and put it on a shelf correctly, with the spine of the book facing outward. In this case, the individual transponders are arranged at as great a distance apart as possible, if appropriate on different sides of the object. The intention will also be to allocate a plurality of corresponding sensor elements, particularly transponders, to the object in order to be able to determine its transport bearing exactly.

The present invention provides a "local positioning system" which can be used to localize and find the position of the objects using the transmitter or sensor element.

In this case, by way of example, the transmitter, particularly the sensor element, can be provided or arranged in any room, with a receiver being connected to a personal computer, for example.

In particular, this system can also be connected to a personal computer directly, without a "service robot", in order to find individual objects in a room.

In addition, particular information about the objects, such as the parameters described above, can also be entered and defined using a personal computer, for example.

In this case, the present invention is also intended to cover, by way of example, the entry of fixed objects or the coordinates of one or more rooms into the PC. In particular, the fixed objects and the rooms with correspondingly fixed objects can be separated from movable objects.

All fixed objects and also the coordinates of each individual room can be entered in advance into the computer and/or into the service robot, for example. The latter then has exact knowledge of where it can move and identifies the coordinates of fixed objects as obstacles, and also the individual rooms for moving.

In addition, all movable objects can be entered manually and/or automatically into the personal computer once, for example.

Appropriate scanners or bar codes can also be used to enter this information directly into a computer in data form, particularly regarding the parameters of size, weight, transport bearing, dropoff platform, name of the object, etc.

In the case of the present "local positioning system", the robot, the finding of objects and the determination of particular locations for objects can all be controlled centrally, for example from a personal computer.

BRIEF DESCRIPTION OF THE DRAWINGS

Other advantages, features and peculiarities of the invention can be found in the description below of preferred exemplary embodiments and with reference to the drawing, in which.

DETAILED DESCRIPTION

Figure 1:
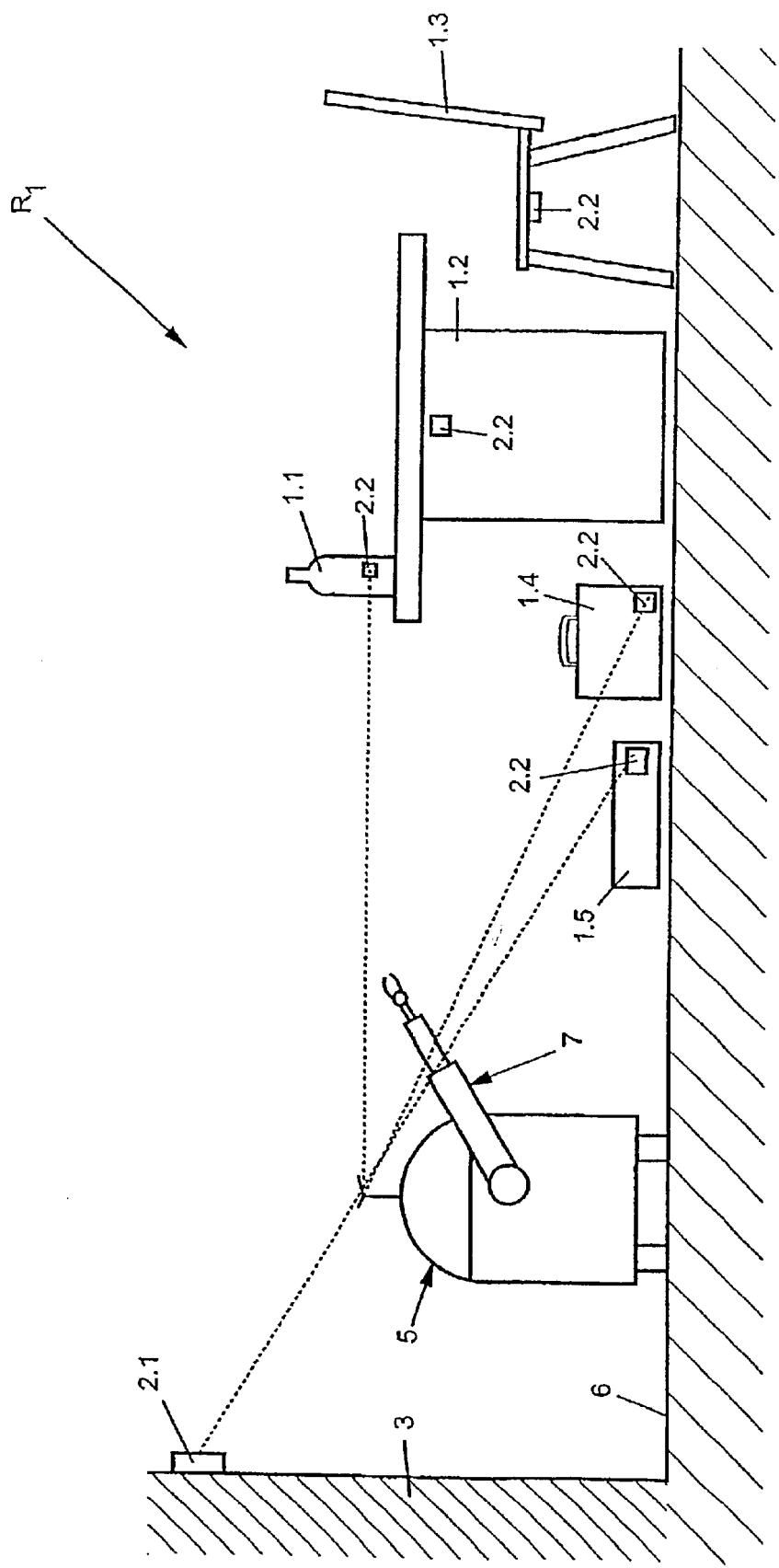
FIG. 1 shows a schematically illustrated side view of an inventive system for identifying, determining and localizing an arbitrary object and/or room using a robot.

With reference to FIG. 1, an inventive system $R_1$ is illustrated for identifying, determining and localizing at least one arbitrary object 1.1 to 1.5 has a central sensor element 2.1, particularly a transmitter, which can be arranged, by way of example, on a wall 3 in a room 4.

The room 4 contains a robot 5 which can be conveyed on a foundation 6. The robot 5, particularly a service robot, can be conveyed independently and is provided with at least one gripping device 7.

Another important feature of the present invention is that every object 1.1 to 1.5 has at least one allocated sensor element 2.2, particularly a transponder.

The transponder stores a particular code, numerical code, digits or the like, with this code being sent by the transponder when an appropriate signal is emitted by the robot.

For each specific transponder or code, the robot 5 stores a corresponding association with an object 1.1 to 1.5 in the form of data. The sensor element 2.2 can be used to store each arbitrary object 1.1 to 1.5 in the robot 5 in the form of data, particularly regarding the parameters for the objects 1.1 to 1.5 including name, size, weight, transport bearing, dimensions, etc.

In this case, each sensor element 2.2 on each arbitrary object 1.1 to 1.5 can be allocated, by way of example, a name for the object 1.1 to 1.5 and also a dropoff position in an arbitrary room 4 in which the object is normally situated. Particularly also by storing the size data, particularly the size dimensions of the object 1.1 to 1.5, and the opportunity to use the sensor element 2.2, particularly the transponder, to identify where the object 1.1 to 1.5 is situated in the room, the robot 5 identifies how it can get to the selected object 1.1 to 1.5 without corresponding obstacles (not shown) or any other objects being in the way.

Particularly as a result of the allocation of, by way of example, a size window for every object, for example in the form of a table, the robot 5 identifies that it can bypass the table in the room 4 in which the table is situated in order to remove, by way of example, another arbitrary object 1.1 with free access using the gripping device 7, and in order to drop off this object at another location, for example.

Figure 2:
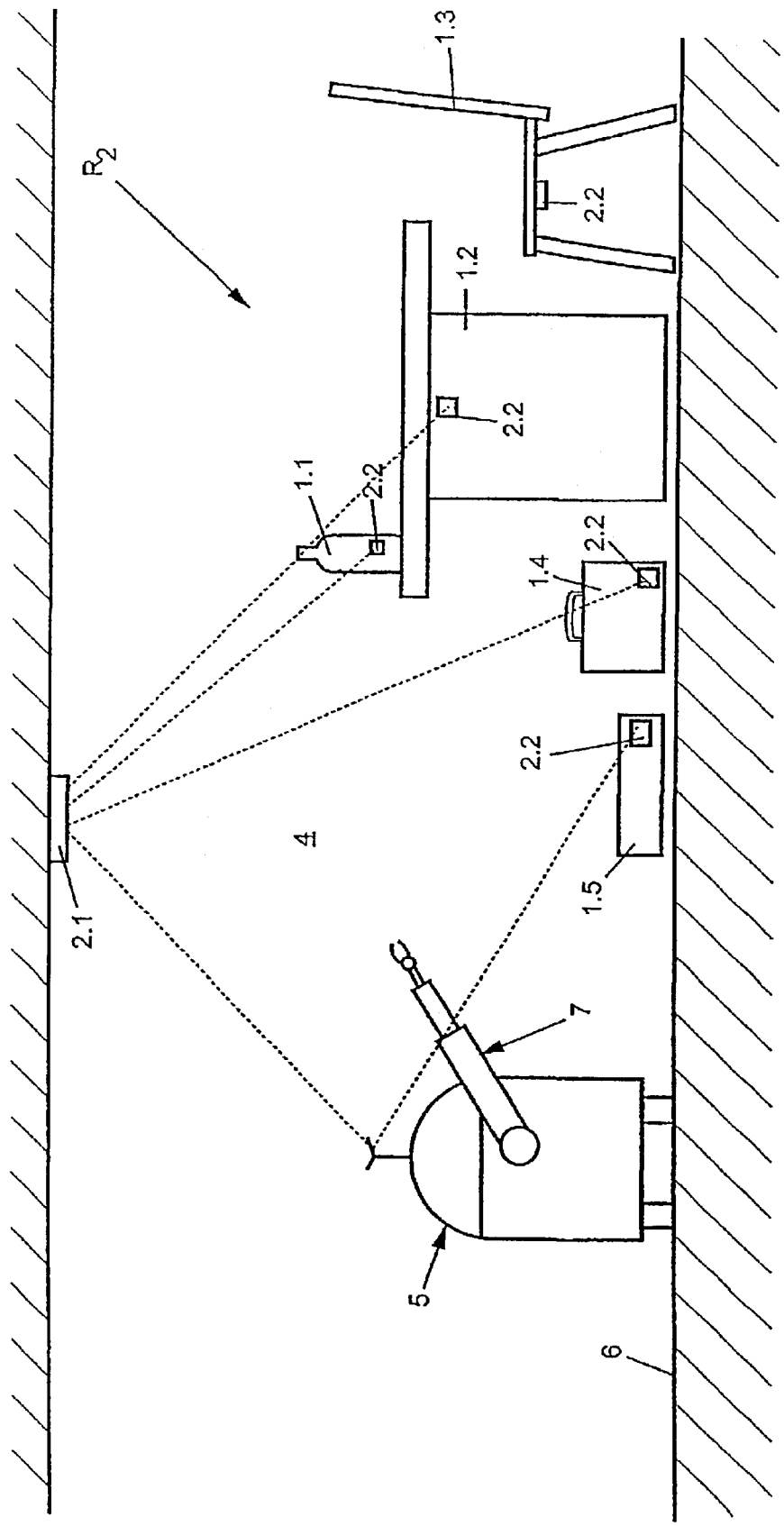
FIG. 2 shows a schematically illustrated side view of the system shown in FIG. 1 as another exemplary embodiment.

In the exemplary embodiment of the present invention shown in FIG. 2, a system $R_2$ is shown in which a sensor element 2.1 is used to transmit the coordinates of the room 5 to the robot 5 centrally, so that the robot in the room 5 identifies all the dimensions of the room and can orient itself for conveyance in this room.

In addition, it receives via the sensor element 2.1, particularly the transmitter, the corresponding signal for a specific room, and particularly the room coordinates.

At the same time, the sensor element 2.1 can also be used to localize any arbitrary object 1.1 to 1.5, to identify it and, in particular, to pass it on to the robot 5.

As a result, in the manner described above, every object is identified, and the size and location of the object in the room 4 or on the foundation 6 is localized for the purpose of picking up said object should this be required, for example, and dropping it off at a particular, selectable point.

Similarly, by virtue of the localization of the individual objects 1.4 and 1.5, as shown in FIG. 5, for example, the robot 5 can move past the individual objects since its size and its size coordinates and position are known.

Figure 3:
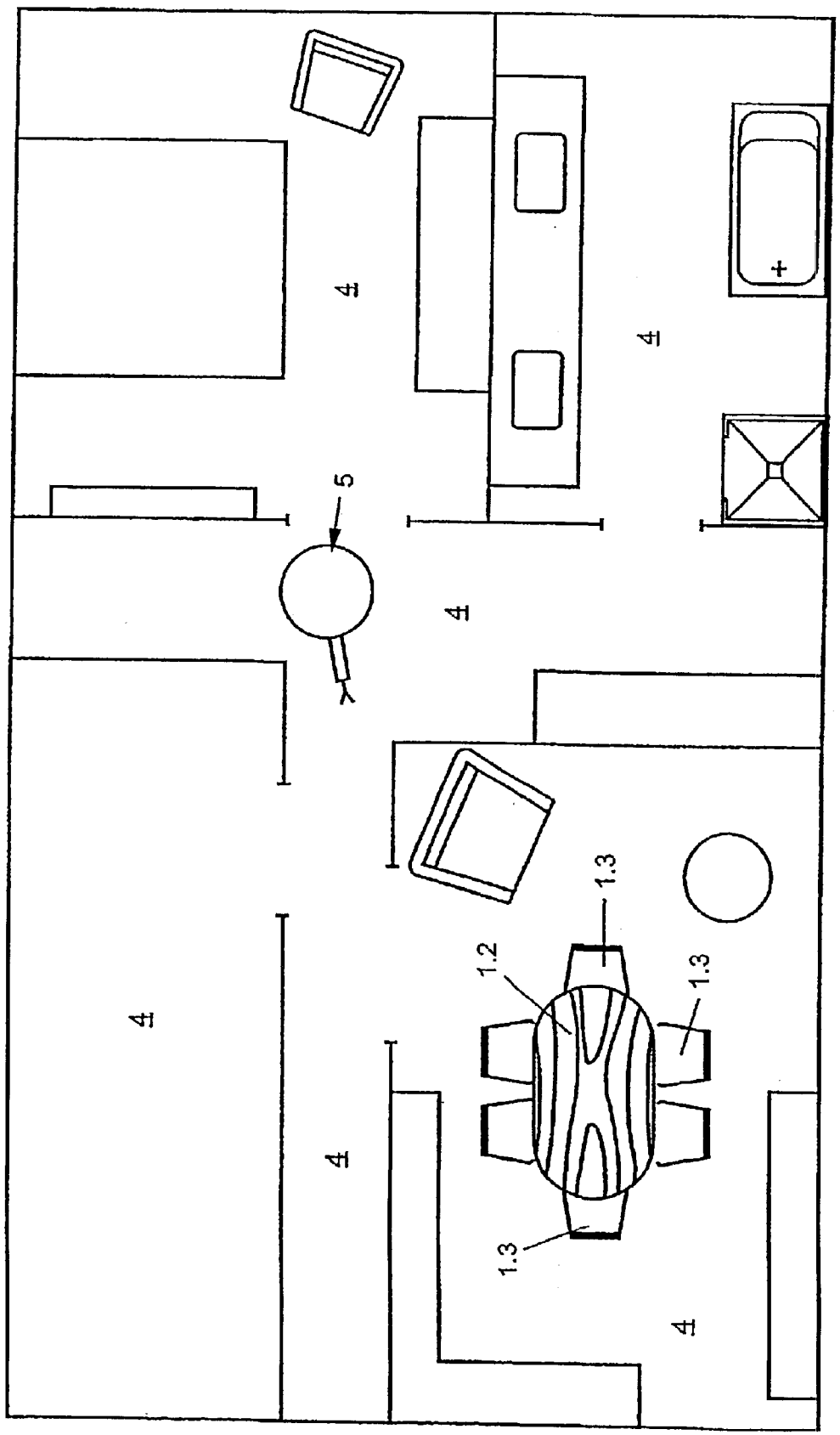
FIG. 3 shows a schematically illustrated plan view of a plurality of rooms in which a robot, particularly a service robot, can be conveyed.
Figure 4:
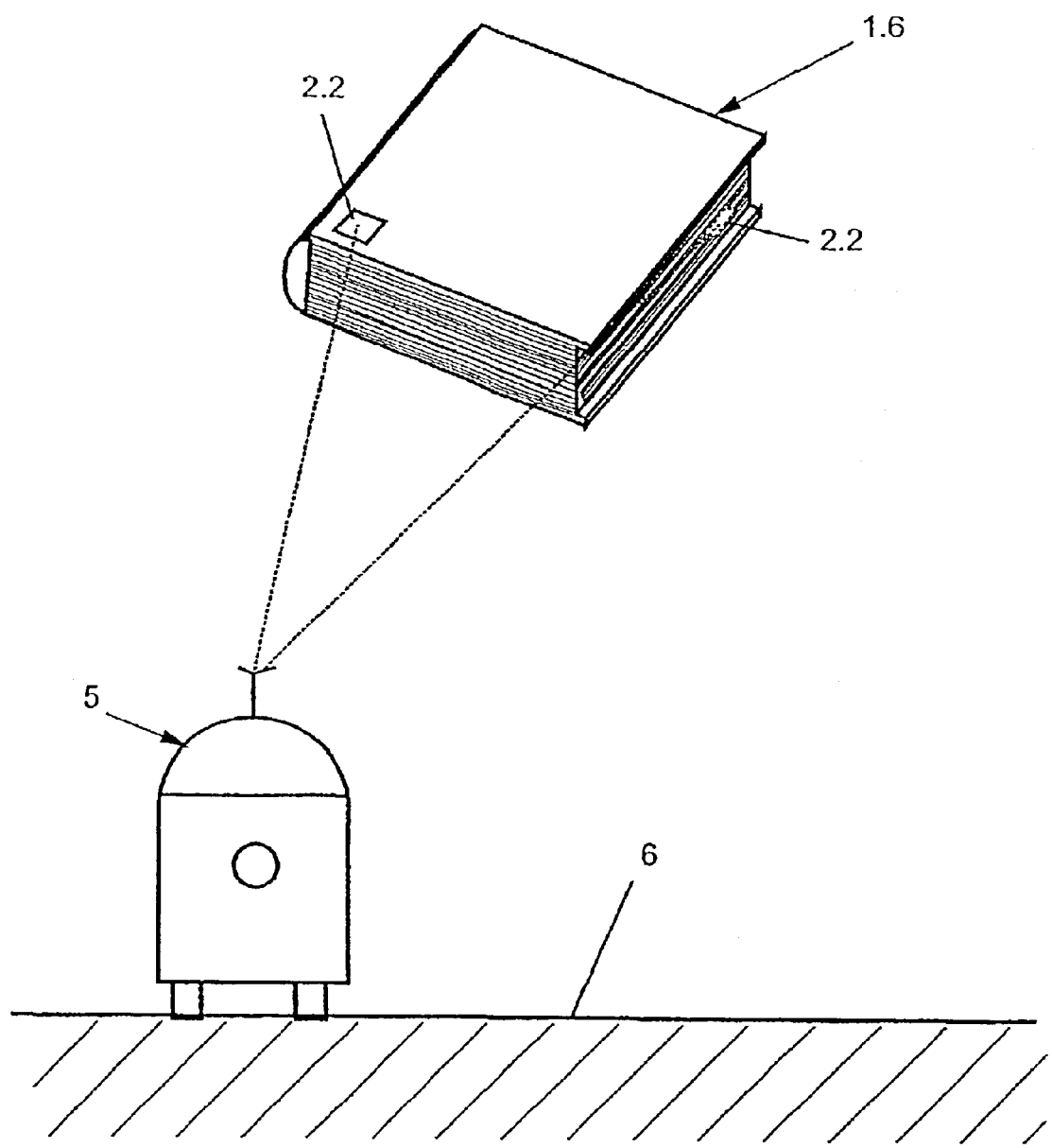
FIG. 4 shows an at least partially perspective view of an object equipped with appropriate sensor elements, particularly transponders.

To reach a particular object 1.4, the object 1.5 can also be taken away or moved aside beforehand, for example. Accordingly, FIG. 3 shows how the robot 5 can move freely through the individual rooms 4, with these coordinates of an individual room specifically being made available to the robot 5 on the basis of the individual sensor elements 2.1 (not shown in more detail here) in each room.

This allows the robot 5 to use these coordinates, which may be entered beforehand, to orient itself in each individual room. The individual sensor elements 2.2, which are not shown in the present case, can be used to identify and to find the position of any arbitrary object 1.1 to 1.5, so that the robot can bypass these objects or can pick them up if desired.

So that a particular bearing and position, firstly for picking up the object 1.1 to 1.5, and a particular bearing for transporting, particularly a transport bearing, can be identified, it has been found to be particularly advantageous to equip an object 1.6 with, by way of example, two sensor elements 2.2 which are arranged at different locations on the object 1.6.

In this case, the two sensor elements 2.2, which define one and the same object 1.6 in coded form, are actually at different and, if possible, separated positions, so that the object 1.6 can be localized and positioned exactly as a result.

This allows the object to be picked up very easily, for example, and, in particular, allows the object 1.6, for example, to be dropped off easily as a book on a bookshelf in this way.

In this way, the robot 5, particularly a service robot, is given the information to pick up the object 1.6 close to the transponder 2.2, particularly in the area of the spine of a book, in order then to drop off said object on a bookshelf, for example.

In the case of the present invention, any desired dropoff point can be allocated to any desired object 1.1 to 1.6 under software control. Using an appropriate command, the robot 5 can then go to the individual objects 1.1 to 1.6 which are not at their location, particularly in their room, where they ought to be and can drop them off there.

This can be used to simplify tidying work considerably. In addition, a fundamentally important feature of the present invention is that, by way of example, finding or going to a particular desired object is very simple.

In this case, only the object is entered into the robot. The position of the object can easily be found by the robot, or its position in the room 4 can be indicated on a display. This will likewise fall within the scope of the present invention.

What is claimed is:

1. A method for identifying, determining, localizing at least one arbitrary object and/or room and for picking up the at least one object using a robot which is conveyed independently on a foundation, comprising orienting in a room a robot by means of a sensor element comprising a transponder or transmitter for transmitting to the robot room coordinates and object-specific coordinates of an arbitrary objects in the room.

2. The method as claimed in claim 1, wherein a bearing for the at least one arbitrary object is identified and localized and/or identified by equipping said object with at least one sensor element comprising a transponder.

3. The method as claimed in claim 2, wherein the object's bearing is identified and/or localized and/or identified by providing said object with at least one sensor element comprising a transponder, the transponder being used to transmit specific parameters for the arbitrary object, including location, bearing, transport bearing, weight, size, type and name of the object.

4. The method as claimed in claim 1, including a plurality of objects wherein every object is equipped with at least one sensor element comprising a transponder, with form-specific and/or object-specific data including coordinates, size, bearing, weight, type and name of the object or room being entered, in encrypted form, in the respective sensor element.

5. The method as claimed in claim 1, wherein the sensor element is used to transmit the room-specific or object-specific data to the service robot, which evaluates these data for the purpose of independently moving in a room in order to pick up or drop off or remove arbitrary objects, the robot using the room-specific data to calculate the bearing thereof itself.

6. The method as claimed in claim 5, wherein an arbitrary object's particular bearing is identified by allocating at least two sensor elements to said object at different positions.

7. The method as claimed in claim 6, wherein a plurality of sensor elements on the arbitrary objects, are used to transmit various vectors in the form of signals to the robot in order to identify a particular bearing for the object, to pick up said bearing, put it into a transport bearing, and then to drop it off at any desired location.

8. The method as claimed in claim 7, wherein the room-specific and/or object-specific data, including coordinates of the room, size of the room, size, weight, transport bearing and dropoff location for the object, are stored in the robot, and an association code appropriately matched thereto is stored in the sensor element, wherein fixed objects and/or rooms being entered as fixed variables in the robot and/or in a PC in order to determine a possible conveyance path.

9. The method as claimed in claim 1, wherein the object has at least two sensor elements comprising transponders at different positions.

10. A system for identifying, determining, localizing at least one arbitrary object and/or room for picking up the object using a robot comprising a service robot, which can be conveyed independently on an arbitrary foundation, wherein a robot is oriented in a room by allocating a sensor element comprising a transmitter for identifying room coordinates and object-specific coordinates of arbitrary objects with an associated sensor element in the room.

11. The system as claimed in claim 10, wherein location coordinates are identified and a size for an arbitrary object is identified by allocating the sensor element thereto.

12. The system as claimed in claim 11, wherein the at least one sensor element, stores coded room coordinates for the robot and coordinates relating to the arbitrary object including size, weight, transport bearing, dropoff location.

13. The system as claimed in claim 12, wherein by allocating each arbitrary object at least one sensor element the object is localized in an arbitrary room independently by the robot or service robot.

14. The system as claimed in claim 13, wherein by allocating at least two sensor elements, to different positions on an arbitrary object it becomes possible to identify a transport bearing, for the object and also a bearing for dropping off the object, using at least two different location vectors.

* * * * *